US005774416A

United States Patent [19]
Sadek et al.

[11] Patent Number: 5,774,416
[45] Date of Patent: Jun. 30, 1998

[54] METHOD AND DEVICE FOR ATTENUATING WATER COLUMN REVERBERATIONS USING CO-LOCATED HYDROPHONES AND GEOPHONES IN OCEAN BOTTOM SEISMIC PROCESSING

[75] Inventors: Selwa Sadek, Houston; Jack Kinkead, Cypress; Bill Cafarelli, Houston; Joe Sanders, Sugar Land, all of Tex.

[73] Assignee: PGS, Tensor, Inc.

[21] Appl. No.: 418,507

[22] Filed: Apr. 7, 1995

[51] Int. Cl.⁶ .................................................. G01V 1/38
[52] U.S. Cl. .............................. 367/24; 364/421; 362/49
[58] Field of Search ............................. 367/24, 321, 471, 367/49; 364/421

[56] References Cited

U.S. PATENT DOCUMENTS

| | | | |
|---|---|---|---|
| 2,757,356 | 7/1956 | Haggerty | 340/7 |
| 2,923,367 | 2/1960 | Cox . | |
| 3,290,645 | 12/1966 | Pavey, Jr. et al. | 340/7 |

(List continued on next page.)

FOREIGN PATENT DOCUMENTS

| | | |
|---|---|---|
| 1 316 479 | 5/1973 | United Kingdom . |
| 2 004 648 | 4/1979 | United Kingdom . |
| 2 030 400 | 4/1980 | United Kingdom . |

OTHER PUBLICATIONS

Cafarelli, B. World Oil, vol. 216, #10, pp. 91–92, 94, 96, 98; Oct. 1995; abst. only herewith, "Subsurface Imaging with Ocean Bottom Seismic".
Cabo–Parra et al, Jour. Acoust. Soc. America, vol. 87, #2, pp. 662–667, Feb. 1990; abst. only herewith.
A.M. Ziolkowski, Geophysical Prospecting; vol. 28, No. 6, pp. 872–901 Dec. 1980, Wavelet Deconvolution Using a Source Scaling Law.
Treitel et al., Geophysics; vol. 47, No. 10, pp. 1375–1401, Oct. 1982, Plane–wave Decomposition of Seismograms.

C.E. Krohn, Geophysics: The Leading Edge of Exploration; pp. 56–60, Apr. 1985; Geophone Ground Coupling.
C.E. Krohn, Geophysics; vol. 49, No. 6, pp. 722–731, Jun. 1984; Geophone Ground Coupling.
G.M. Hoover et al., Geophysics; vol. 45, No. 8, pp. 1239–1253, Aug. 1980; The Influence of the planted geophone on seismic land data.
B. Widrow et al., Proceedings of the IEEE; vol.63, No.12, pp. 1692–1716, Dec. 1975; Adaptive Noise Cancelling: Principles and Applications.
J. White, Chapter 2–Plane Waves McGraw Hill pub.; pp. 15–41, 1965, Seismic Waves: Radiation, Transmission, and Attenuation.
H. Washburn et al., Presented at the Annual Meeting, Chicago, Apr. 11, 1940; The effect of the placement of a seismometer on its response characteristics.
P.C. Wuenschel, Geophysics; vol. 53, No.3, pp. 359–364, Mar. 1988, Removal of the detector–ground coupling effect in the vertical seismic profiling environment.

(List continued on next page.)

*Primary Examiner*—Nelson Moskowitz
*Attorney, Agent, or Firm*—Gordon T. Arnold

[57] ABSTRACT

In ocean bottom seismic exploration, it is common for co-located hydrophones and geophones to be deployed on the ocean bottom. One problem encountered is the water column reverberation. An improved method and device is proposed for attenuating water column reverberations using co-located hydrophones and geophones in ocean bottom seismic processing. In this method, each recorded hydrophone and geophone signal, or trace, is decomposed into a series of narrow band-pass filtered traces. For each of the filtered traces, a measurement of the energy level is made upon which normalization factors are computed and applied. The resulting filtered, normalized traces are summed. Optionally, prior to application, the normalization factors can be organized by common shot, common group, common offset, and surface consistent normalization factors derived and applied for each pass-band.

29 Claims, 9 Drawing Sheets

U.S. PATENT DOCUMENTS

| | | | |
|---|---|---|---|
| 3,299,397 | 1/1967 | Pavey, Jr. et al. | 340/7 |
| 3,343,626 | 9/1967 | Sparks . | |
| 3,350,683 | 10/1967 | Sengbush | 340/7 |
| 3,689,874 | 9/1972 | Foster et al. | 340/15.5 F |
| 3,943,484 | 3/1976 | Balderson | 340/7 |
| 3,979,713 | 9/1976 | Parrack | 340/7 |
| 4,134,097 | 1/1979 | Cowles | 340/7 |
| 4,146,871 | 3/1979 | Ruehle | 340/7 |
| 4,234,938 | 11/1980 | Allen et al. | 367/24 |
| 4,253,164 | 2/1981 | Hall, Jr. | 367/22 |
| 4,296,481 | 10/1981 | Weiss | 367/20 |
| 4,348,749 | 9/1982 | Galbraith, Jr. | 367/46 |
| 4,380,059 | 4/1983 | Ruehle | 367/46 |
| 4,437,175 | 3/1984 | Berni | 367/24 |
| 4,449,208 | 5/1984 | Moeckel et al. . | |
| 4,477,887 | 10/1984 | Berni | 367/20 |
| 4,486,865 | 12/1984 | Ruehle | 367/24 |
| 4,520,467 | 5/1985 | Berni | 367/24 |
| 4,581,724 | 4/1986 | Zachariadis | 367/21 |
| 4,622,513 | 11/1986 | Stich . | |
| 4,622,519 | 11/1986 | Goldman | 328/137 |
| 4,644,507 | 2/1987 | Ziolkowski | 367/23 |
| 4,644,508 | 2/1987 | Zachariadis | 367/24 |
| 4,658,387 | 4/1987 | Dolengowski et al. | 367/144 |
| 4,685,090 | 8/1987 | Krevor | 367/20 |
| 4,733,379 | 3/1988 | Lapetina et al. | 367/20 |
| 4,736,345 | 4/1988 | Keckler et al. | 367/20 |
| 4,752,916 | 6/1988 | Lowenthal | 367/24 |
| 4,757,480 | 7/1988 | Gutowski | 367/47 |
| 4,794,572 | 12/1988 | Sondergeld et al. | 367/31 |
| 4,803,666 | 2/1989 | Alford | 367/36 |
| 4,817,061 | 3/1989 | Alford et al. | 361/75 |
| 4,821,241 | 4/1989 | Berglund | 367/20 |
| 4,888,743 | 12/1989 | Thomsen | 367/75 |
| 4,903,244 | 2/1990 | Alford | 367/36 |
| 4,910,716 | 3/1990 | Kirlin et al. | 367/24 |
| 4,912,979 | 4/1990 | Sondergeld et al. | 73/594 |
| 4,933,913 | 6/1990 | Thomsen | 367/75 |
| 4,935,903 | 6/1990 | Sanders et al. | 367/24 |
| 4,937,793 | 6/1990 | Shuck et al. | 367/24 |
| 4,956,822 | 9/1990 | Barber et al. | 367/23 |
| 4,979,150 | 12/1990 | Barr | 367/24 |
| 4,992,993 | 2/1991 | Chambers | 367/21 |
| 5,027,332 | 6/1991 | Alford | 367/75 |
| 5,029,146 | 7/1991 | Alford | 367/75 |
| 5,136,552 | 8/1992 | Kelly et al. | 367/47 |
| 5,136,554 | 8/1992 | Thomsen et al. | 367/75 |
| 5,163,028 | 11/1992 | Barr et al. | 367/13 |
| 5,235,554 | 8/1993 | Barr et al. | 367/13 |
| 5,251,183 | 10/1993 | McConnell et al. | 367/21 |
| 5,257,241 | 10/1993 | Henderson et al. | 367/15 |
| 5,365,492 | 11/1994 | Dragoset, Jr. | 367/21 |
| 5,396,472 | 3/1995 | Paffenholz | 367/24 |

OTHER PUBLICATIONS

T.H. Tan, Geophysics; vol. 52, No.12, pp. 1715–1717, Dec. 1987, Reciprocity theorem applied to the geophone–ground coupling problem.

D.W. Bell et al, A.A.P.G. Bulletin; vol.72 No.3, p. 375, Mar. 1988, Two–Trace Directional Filter for Processing Offset Vertical Seismic Profiles.

M. Brink et al., 49th Mtg. of European Assn. of Exploration Geophysicists, Jun. 1987, Marine Seismic Exploration Using Vertical Receiver Arrays: Acquisition in Bad Weather.

M. Brink, published by Society of Exploration Geophysicists ann. conference; pp. 460–463, 1988, Application of Vertical Receiver Arrays in 3–D Seismic Exploration.

D.J. Monk, First Break; vol. 8, No. 3, pp. 96–104, Jun. 1989, Wavefield Separation of Twin Streamer Data.

A.M. Ziolkowski Geophysical Prospecting; vol. 28, No. 6, pp. 902–918, Dec. 1980, Source Array Scaling for Wavelet Deconvolution.

"Subsurface Imaging with Ocean Bottom Seismic".

METHOD AND DEVICE FOR ATTENUATING WATER COLUMN REVERBERATIONS USING CO-LOCATED HYDROPHONES AND GEOPHONES IN OCEAN BOTTOM SEISMIC PROCESSING

BACKGROUND OF THE INVENTION

This invention relates generally to marine seismic exploration and, more particularly, to attenuating water column reverberations in seismic processing of co-located hydrophones and geophones. One problem encountered in marine seismic exploration is the water column reverberation. Various attempts at solutions to this problem have been proposed using co-located hydrophones and geophones (see, e.g., the following, all of which are incorporated herein by reference):

Barr, U.S. Pat. No. 4,979,150

Dragoset, U.S. Pat. No. 5,365,492

Barr & Sanders, U.S. Pat. No. 5,163,028

Ruehle, U.S. Pat. No. 4,486,865

The hydrophones, being pressure sensitive transducers, and the geophones, being particle velocity transducers, detect different characteristics of the environment. In particular, they detect the downwardly propagating receiver ghost with opposite polarity. Consequently, when traces from co-located hydrophones and geophones are suitably combined, the receiver ghost tends to cancel and the reverberation problem is attenuated. All such methods involve either the estimation and computation of a scalar dependent upon an acoustical impedance, or the design of an inverse filter.

The scalar based methods require that a scalar be derived either deterministically or statistically. The deterministic method, called calibration, involves measuring and comparing the responses of the pressure and velocity transducers to a pressure wave induced in the water. One statistical method involves comparing the magnitude of the pressure signal autocorrelation to the pressure and velocity signal crosscorrelation at selected lag values or, alternatively, comparing the magnitude of the pressure signal autocorrelation to the velocity signal autocorrelation at selected lag values. Another statistical method involves iteratively scaling and summing a refined velocity signature with a pressure signature; the preferred scale factor being determined by a coefficient of convergence of the autocorrelation of the sum.

The derivation of the appropriate scale factors presents several problems. First, from an operational standpoint, the deterministic method requires additional field measurements, which often increases survey acquisition time and cost. Acquiring accurate calibration data requires shooting a marine seismic source as close as possible to directly over each pair of hydrophones and geophones. This can be quite difficult, particularly in shallow water, and the results can be compromised. Second, statistical methods of deriving the scale factors suffer in the presence of high levels of seismic noise.

Even when the precise scale factor can be determined, the result may be less than optimal for a variety of reasons. Those skilled in the art realize that the application of a single scalar, no matter how precisely estimated, cannot adequately compensate for the spectral differences often observed between co-located hydrophones and geophones. These differences can be due to a variety of reasons, but chief among them are geophone coupling imperfections and noise. Geophone coupling imperfections lead to frequency dependent differences (both amplitude as a function of frequency and phase as a function of frequency) between co-located hydrophones and geophones. Also, noise detected on geophones may be of a significantly higher level and may have an entirely different spectral shape than noise detected on co-located hydrophones. Consequently, the results from scalar based methods are compromised.

Inverse filter based methods also have problems. One method is a deconvolution. Several methods for performing deconvolution are well known in the art of seismic processing. However, deconvolution methods employing inverse filters suffer in the presence of high levels of seismic noise, especially when the noise spectrum differs significantly from that of the downgoing wavelet.

Another method involves the design of a filter which compensates for the inherent impulse response differences between the two sensor types, as well as response differences caused by imperfect coupling. However, when the filter is designed using the calibration procedure, it has the same associated problems as described above. When the filter is designed from the seismic data itself, it suffers in the presence of high levels of seismic noise, so the results of inverse filter based methods can be compromised. It is an object of the invention to provide a process and device which overcomes the above-referenced problems.

SUMMARY OF THE INVENTION

An improved method of attenuating water column reverberations in ocean bottom seismic processing using co-located hydrophones and geophones is described below.

According to one embodiment of the invention, a process for attenuating noise in dual hydrophone/geophone data comprises performing the steps of: receiving a signal from a seismic sensor, decomposing said signal into a plurality of bandwidth-limited signals, normalizing said bandwidth-limited signals based on the energy level of at least two of said bandwidth-limited signals, and summing the normalized signals.

According to another embodiment of the invention, each recorded hydrophone and geophone signal, or trace, is decomposed into a series of band-pass filtered traces. For each of the filtered traces, a measurement of the energy level (for example, rms amplitude) is made over one or more time windows. Based upon the measured energy level, normalization factors are computed from and then applied to each time window. The resulting filtered, normalized traces are summed. Finally, the geophone and hydrophone traces at each group are summed.

Further, according to a further embodiment, prior to application, the normalization factors are organized according to different surface-consistent factors.

One benefit of the invention is that no scale factor, whether derived deterministically or statistically, is needed or applied. Also, no deconvolution inverse filtering is needed. In noisy areas, especially where the noise is limited to specific frequency bands or varies significantly in strength between the two sensors, or where significant coupling imperfections exist, this process produces improved results compared to the prior art. Although no attempt is made to compensate for phase differences due to coupling imperfections, a first order approximation to amplitude related coupling differences is inherent.

The result is a broad-band, spectrally balanced, combination of co-located hydrophone and geophone signals, which attenuates water column reverberations.

The normalization factors compensate for amplitude differences between the two sensors due to coupling, noise, sensitivity, directivity, and perhaps other factors. They do not depend upon an acoustical impedance.

BRIEF DESCRIPTION OF THE DRAWINGS

The invention will be better understood by reference to the following drawings.

FIG. 8a is the amplitude spectrum of the summation of FIG. 7a.

While the invention is susceptible to various modifications and alternative forms, specific embodiments are described herein and are shown in the drawings by way of example. However, it should be understood that the invention is not limited to the particular forms disclosed. Those of skill in the art will recognize other embodiments, modifications, equivalents and alternatives following within the spirit and scope of the invention as defined by the appended claims.

DETAILED DESCRIPTION OF EMBODIMENTS OF THE INVENTION

According to one embodiment of the present invention, there is provided a process for attenuating noise in dual hydrophone/geophone data, said process comprising: receiving a signal from a seismic sensor; decomposing said signal into a plurality of bandwidth-limited signals; normalizing said bandwidth-limited signals based on the energy level of at least two of said bandwidth-limited signals; and summing the normalized signals.

According to a further embodiment, the decomposing comprises passing said signal through a plurality of bandpass filters.

According to still a further embodiment, there is further provided the step of measuring an energy level of said bandwidth-limited signals during a time window, by determining a root-mean-square of the amplitude of said bandwidth-limited signals.

According to a further embodiment, the normalizing comprises applying a normalization factor to said bandwidth-limited signals, which are organized such that the normalization factor is applied, alternatively to: a plurality of common shot bandwidth-limited signals; a plurality of common group bandwidth-limited signals; or a plurality of common offset bandwidth-limited signals. Alternatively, the normalizing comprises applying a surface-consistent normalization factor.

According to still a further embodiment, the normalizing comprises determining a normalization factor by dividing said energy level into a constant.

According to an even further embodiment, there is further provided the step of preconditioning said seismic signal by convolving said seismic signal with a theoretical reverberation sequence.

In still a further embodiment, there is further provided the step of convolving said bandwidth-limited signals with a theoretical reverberation sequence.

Figure 12:
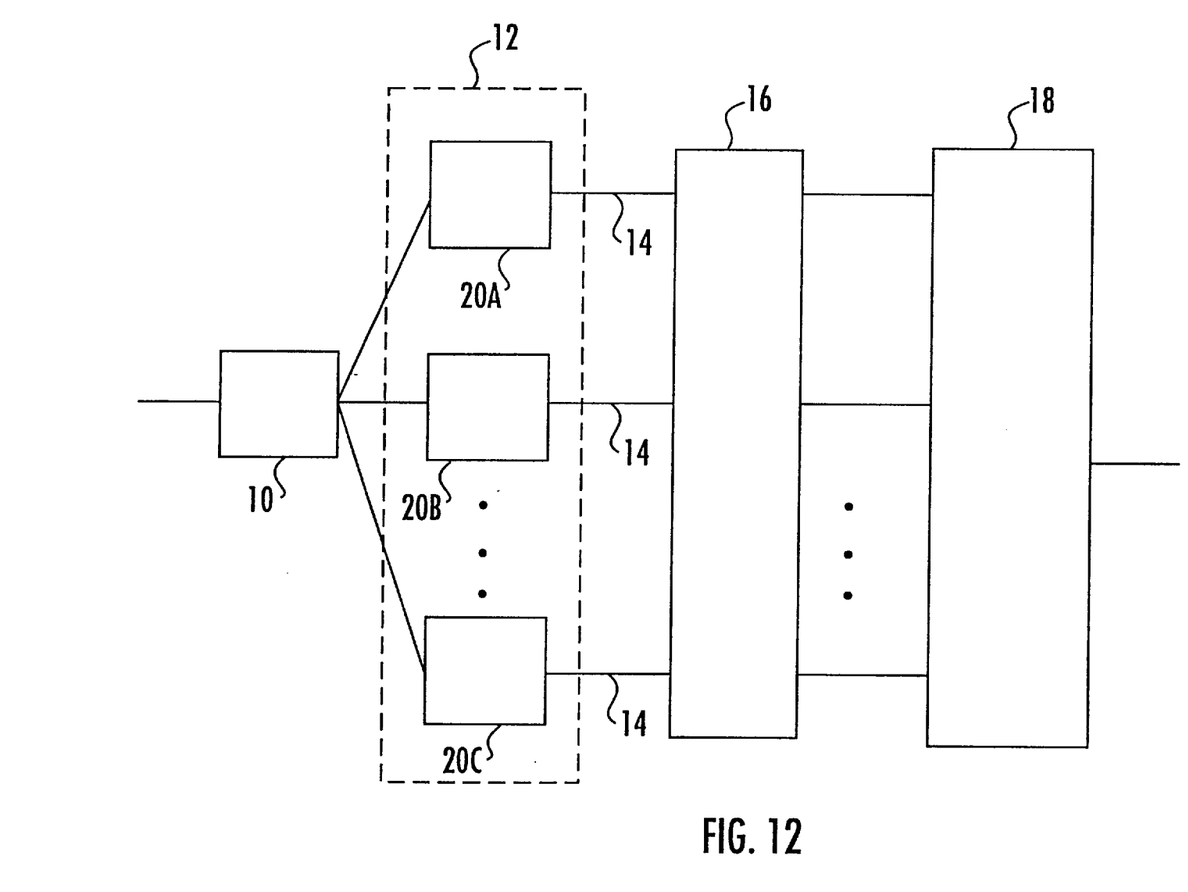
FIG. 12 shows a schematic diagram for an apparatus useful for practicing an embodiment of the invention.

According to yet another embodiment, shown in FIG. 12, there is provided an apparatus for attenuating noise in dual hydrophone/geophone data, said apparatus comprising: a seismic sensor signal receiver (10); a seismic sensor signal decomposer (12) which produces a plurality of bandwidth-limited signals (14); a bandwidth-limited signal normalizer (16) responsive to the energy level of at least two of said bandwidth limited signals (14) during a time window; and a normalized-signal summer (18). FIG. 12 also shows an example of an acceptable decomposer (12) comprising a plurality of bandpass filters (20a, 20b, 20n).

Figure 13:
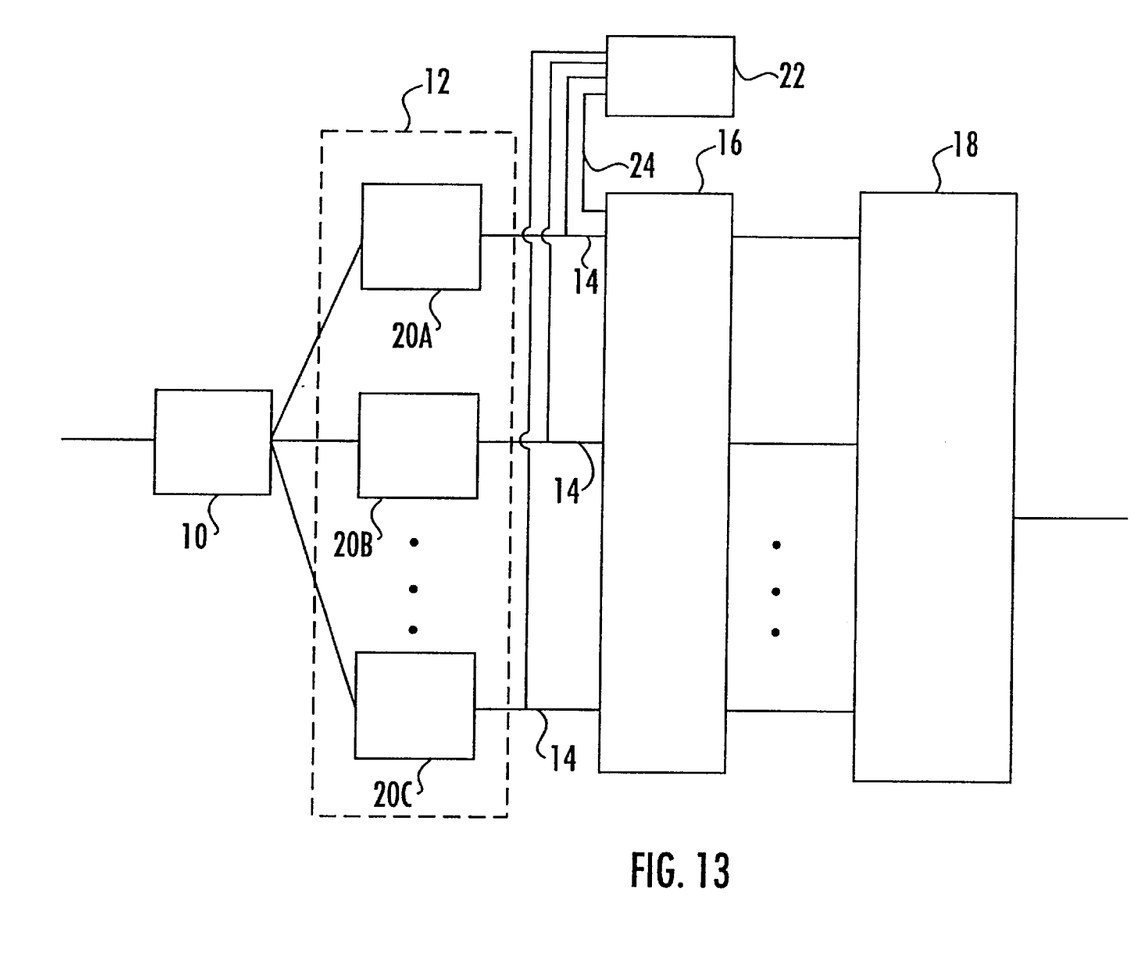
FIG. 13 shows a schematic diagram for an apparatus useful for practicing an embodiment of the invention.

According to a further embodiment, shown in FIG. 13, an energy level detector (22) is connected to an energy level input (24) of said normalizer (16), and the energy level detector (22) provides said normalizer with a root-mean-square value of the amplitude of at least one of said bandwidth-limited signals (14).

According to still a further embodiment, the normalizer (16) applies a normalization factor to a plurality of bandwidth-limited signals (14), and the normalization factor is applied to a plurality of traces either: in a common shot, in a common group, with a common offset, or any combination thereof. Alternatively, the normalizer (16) applies surface-consistent factors for each bandwidth.

In one embodiment, the normalizer (16) determines a normalization factor by dividing said energy level into a constant, which comprises a predetermined amplitude level, set on a prospect-wide basis.

Figure 14:
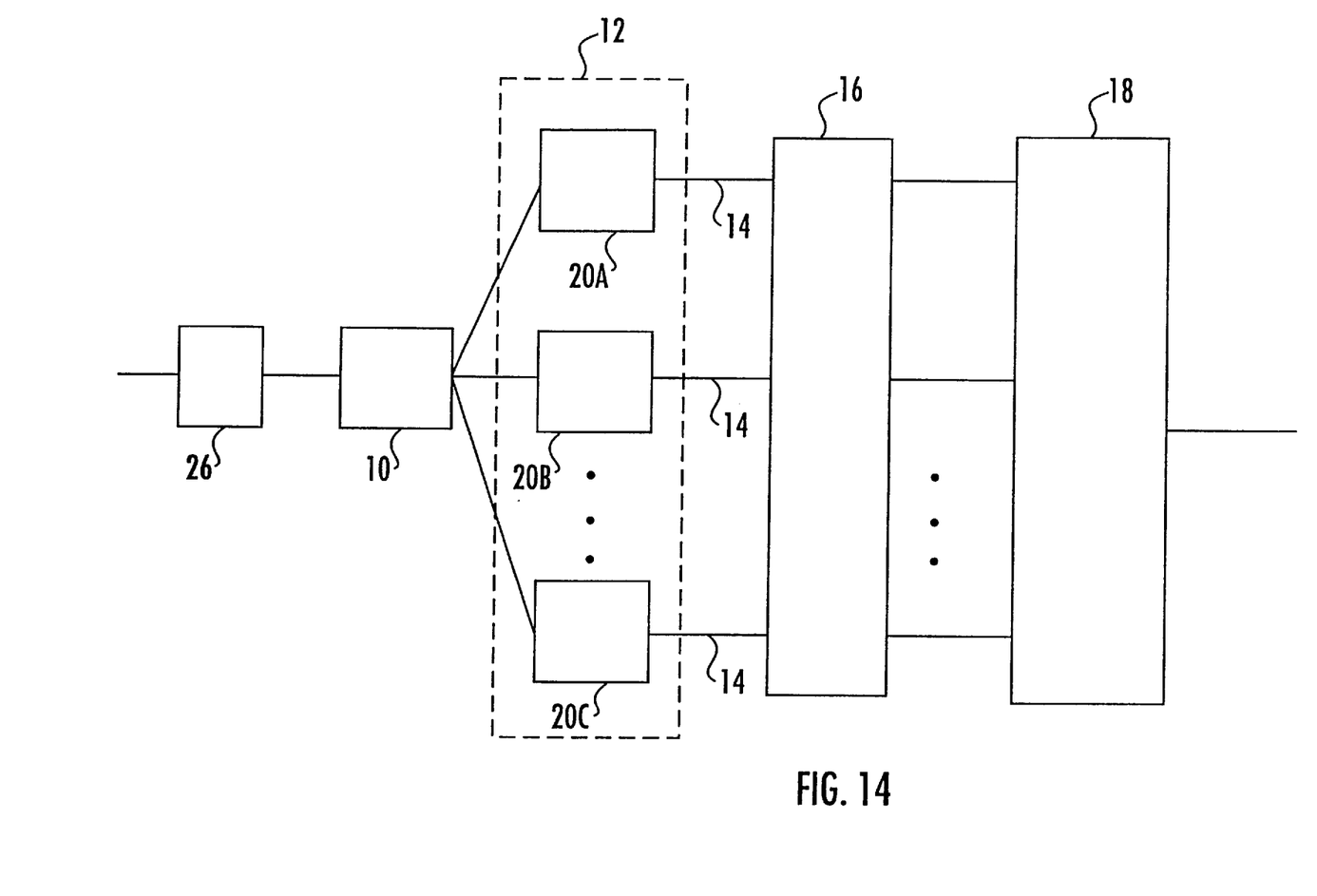
FIG. 14 shows a schematic diagram for an apparatus useful for practicing an embodiment of the invention.
Figure 15:
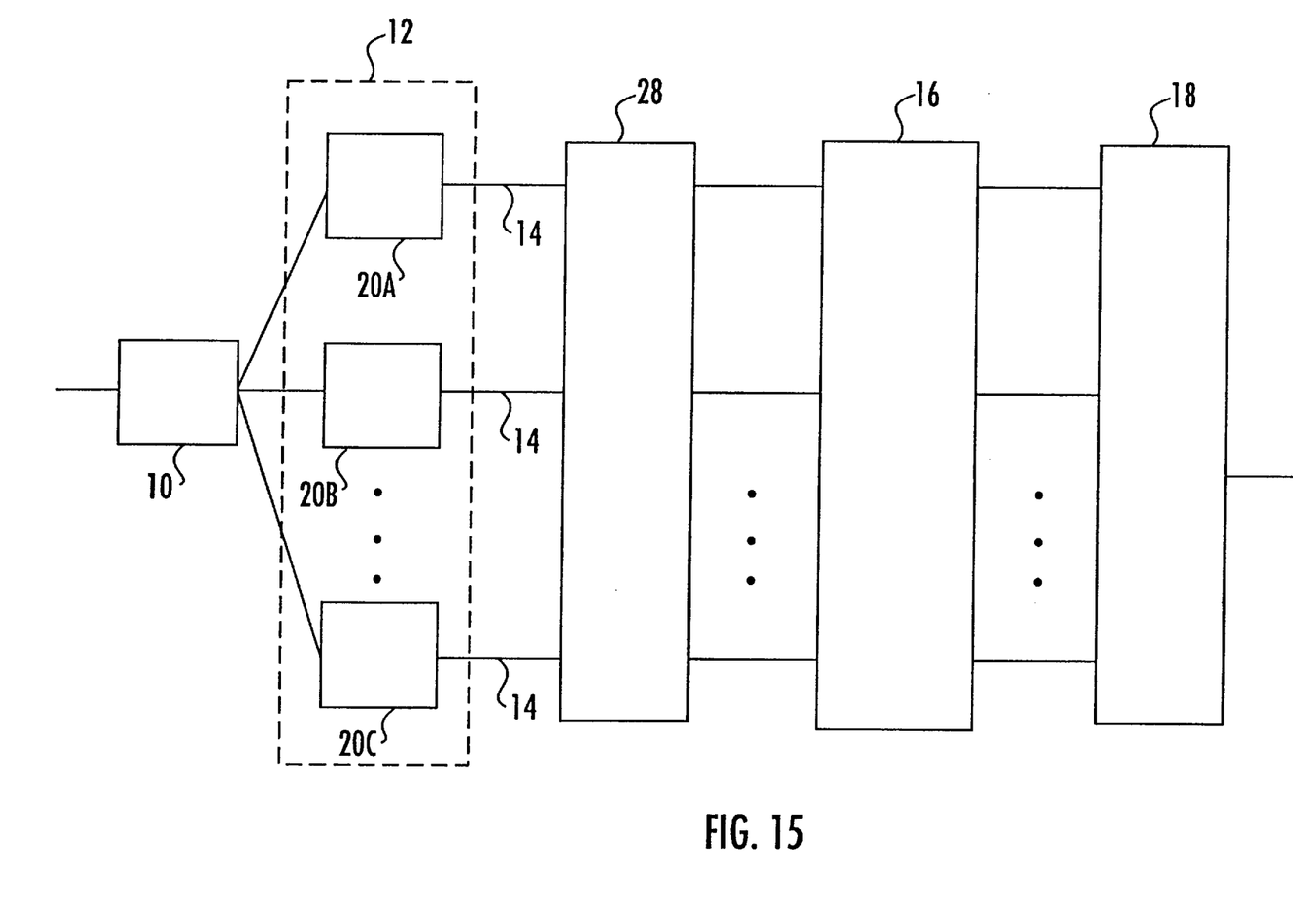
FIG. 15 shows a schematic diagram for an apparatus useful for practicing an embodiment of the invention.

According to still a further embodiment, shown in FIG. 14, there is provided a preconditioner (26) which convolves the seismic signal with a theoretical reverberation sequence based upon a measured water depth and a presumed water bottom reflectivity. Alternatively, as shown in FIG. 15, a bandwidth-limited signal convolver (28) is provided, which is responsive to a theoretical reverberation sequence based upon a measured water depth and a presumed water bottom reflectivity.

According to still a further embodiment, decomposing the received signal is performed by passing the signal through a plurality of bandpass filters. In this embodiment, the number of band-pass filters used will probably vary from three to six. Fewer than three will not allow adequate spectral balancing. More than six, though increasing computational costs, would not likely produce any benefits and might actually create problems if harmful Gibbs phenomena are created by the very narrow bandpass filters. The frequency range spanned will approximately cover the expected seismic frequency band. One example embodiment of the invention uses four bandpass filters with the following pass-bands: 5–20 Hz, 20–35 Hz, 35–50Hz and 50–65 Hz.

In another embodiment of the invention, the energy level of the bandwidth-limited signals is measured during a time window which is chosen over good quality seismic reflection data, beneath the direct arrivals, refractions, and horizontally propagating energy, but above the poor signal-to-noise ratio data of later record times. The window should be representative of the energy level of the trace.

According to alternate embodiments, the energy level is measured in different ways. For example, in one embodiment the energy level is measured as a root-mean-square of the amplitude of said bandwidth-limited signals. According to alternate embodiments, the energy is measured by reference to the peak-to-peak, median average, or absolute value of the amplitude of the signals. Also, in yet another embodiment, the energy level is measured and normalization factors computed, for only one window per trace.

In another embodiment of the invention, the normalization factors are organized by "common shot," where all normalization factors are computed from signals which have been generated by the same seismic source.

In a further embodiment of the invention, the normalization factors are organized by "common group," where all normalization factors are computed from signals which have been generated by the same group. In this embodiment, a "group" is defined as a seismic sensor, or an electrically connected array of seismic sensors, which provides a signal to a single channel of a seismic signal receiver.

According to yet another embodiment, the normalization factors are organized by "common offset," where all normalization factors are computed from signals generated by a set of seismic sensors which are grouped into ranges of source-detector distances. It should be noted that the above embodiments are merely illustrative, not exhaustive, and the invention may be practiced by normalizing the signals on the basis of other surface-consistent parameters.

In another embodiment of the invention, a normalization factor is obtained by dividing the energy level into a constant. In this embodiment, the constant is set to an arbitrary value which provides normalized signals which are within a desired dynamic range of the system. Further, in some cases, as will be recognized by those of skill in the art, it will be desirable to set the constant on a prospect-wide basis.

In a further embodiment of the invention, the seismic signal is preconditioned by convolving the seismic signal with a theoretical reverberation sequence. Such a theoretical reverberation sequence is determined, according to one example embodiment, as a function of the measured water depth and a presumed water bottom reflectivity, wherein, for a hydrophone, the reverberation sequence is calculated as follows:

$$P(Z) = 1Z^0 - (1+R)Z^1 + R(1+R)Z^2$$

For a geophone in this example, the reverberation sequence is calculated as follows:

$$P(Z) = 1Z^0 + (1-R)Z^1 - R(1-R)Z^2$$

where Z is defined as $e^{-iwTw}$, Tw is the two-way travel time in the water layer, and R is the reflection coefficient of the water bottom.

True reflection signals are assumed to contain notches corresponding to these reverberation operators; what remains is assumed to be noise. Consequently, applying this modification should improve the signal-to-noise ratio of the hydrophone and geophone signals by eliminating this noise.

According to a still further embodiment of the invention, the bandwidth-limited signals are convolved with a theoretical reverberation sequence. The theoretical reverberation sequence is calculated according to the same formulas discussed above.

Figure 1:
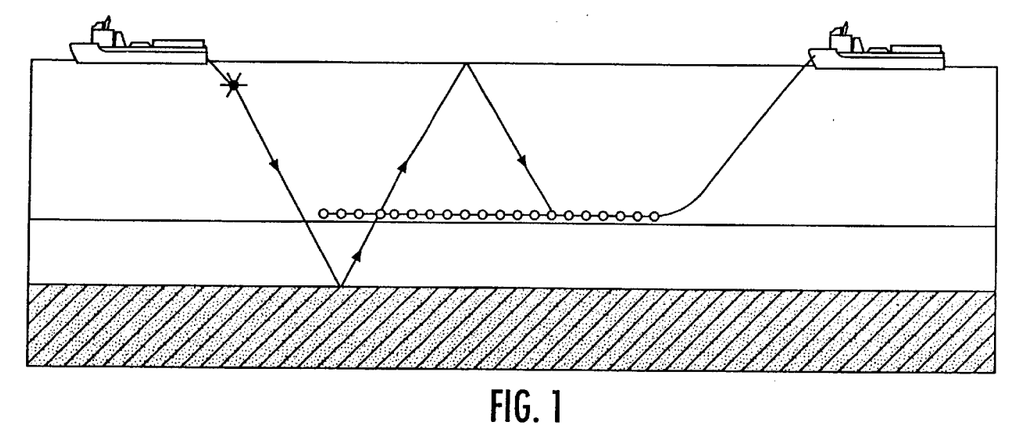
FIG. 1 shows an example of water column reverberation.
Figure 2A:
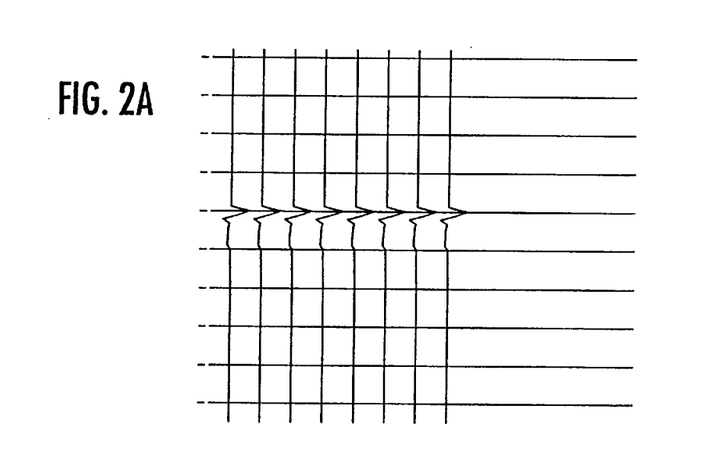
FIG. 2a is the input wavelet synthetic seismogram.
Figure 2B:
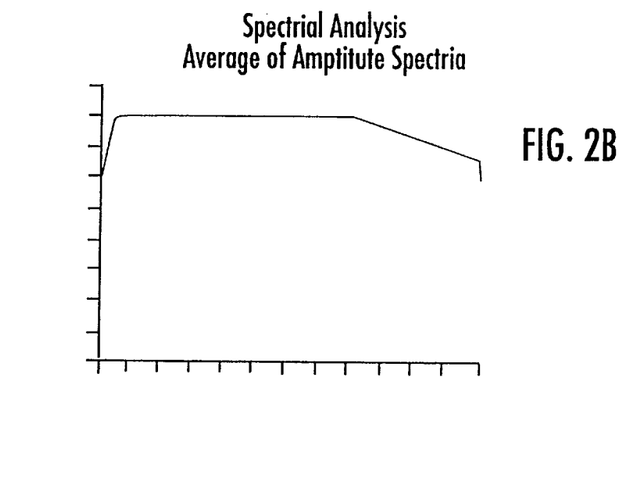
FIG. 2b is the amplitude spectrum of the input wavelet.

Synthetic seismograms were generated to demonstrate the validity of the process. For cosmetic reasons, a suite of eight identical traces was generated. FIG. 2a shows a spike of unit amplitude at a two-way travel time of 800 ms., convolved with a minimum phase low-pass Butterworth filter. It is designed to represent the recorded downgoing wavelet generated by a typical tuned airgun array. This is the input wavelet synthetic seismogram. It is the desired result, having not been contaminated by the harmful effects of the ghost reverberation or geophone coupling imperfections. FIG. 2b is the amplitude spectrum of the input wavelet.

Figure 3A:
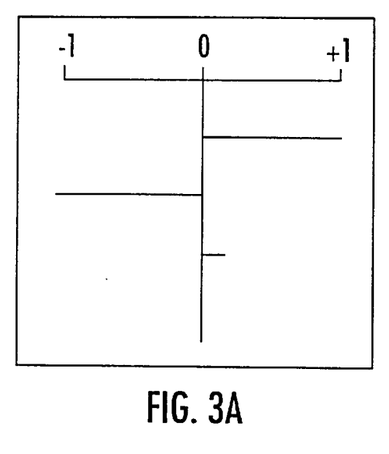
FIG. 3a is the hydrophone ghost reverberation sequence.
Figure 3B:
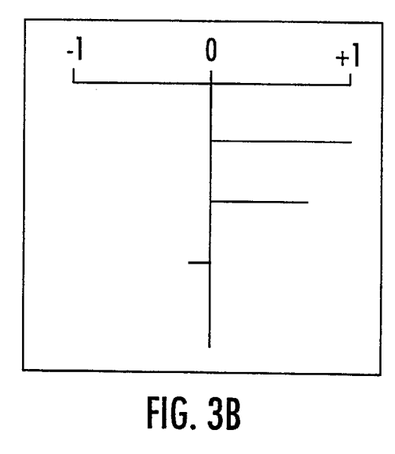
FIG. 3b is the geophone ghost reverberation sequence.

FIG. 3a is the hydrophone ghost reverberation sequence for a hydrophone on the ocean bottom at a depth of 100 feet. The water bottom reflectivity chosen was 0.2, typical of many parts of the Gulf of Mexico. FIG. 3b is the corresponding geophone ghost reverberation sequence for a co-located geophone.

Figure 4A:
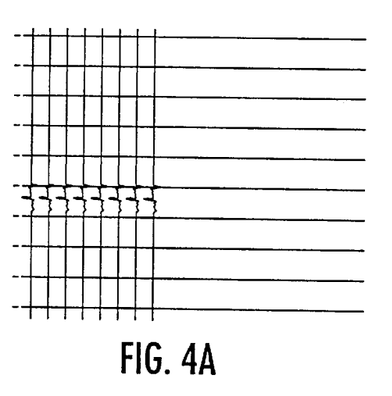
FIG. 4a is the hydrophone ghost synthetic seismogram.
Figure 4B:
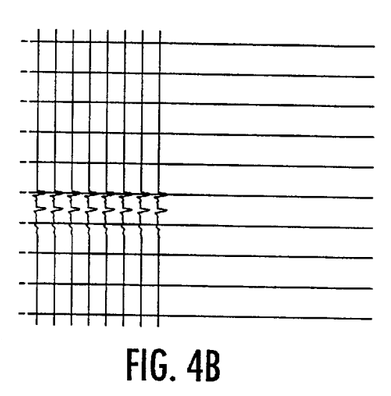
FIG. 4b is the geophone ghost synthetic seismogram.

FIG. 4a is the convolution of the input wavelet with the hydrophone ghost reverberation sequence. This is the hydrophone ghost synthetic seismogram. FIG. 4b is the convolution of the input wavelet with the geophone ghost reverberation sequence. This is the geophone ghost synthetic seismogram.

Figure 5A:
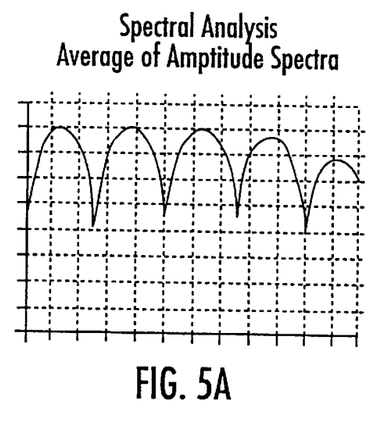
FIG. 5a is the amplitude spectrum of the hydrophone ghost synthetic seismogram.
Figure 5B:
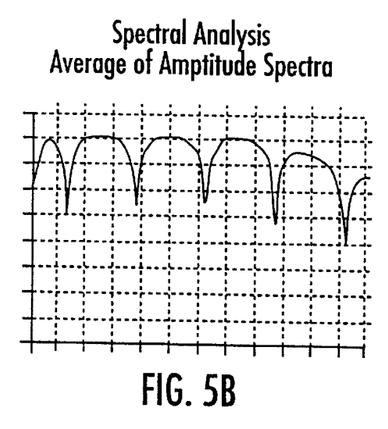
FIG. 5b is the amplitude spectrum of the geophone ghost synthetic seismogram.

FIG. 5a is the amplitude spectrum of the hydrophone ghost synthetic seismogram. The notches in the spectrum correspond to the hydrophone ghost. FIG. 5b is the amplitude spectrum of the geophone ghost synthetic seismogram. The notches in the spectrum correspond to the geophone ghost. Where there are notches in the geophone spectra, there are peaks in the hydrophone spectra.

Figure 6A:
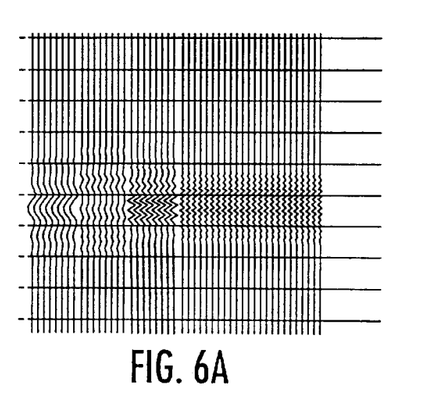
FIG. 6a is the hydrophone ghost synthetic seismogram decomposed into a series of six narrow bandpass filters.
Figure 6B:
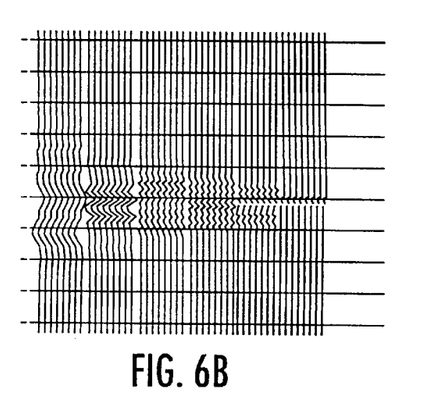
FIG. 6b is the geophone ghost synthetic seismogram decomposed into a series of six narrow bandpass filters.

FIG. 6a is the hydrophone ghost synthetic seismogram decomposed into a series of six narrow bandpass filters. FIG. 6b is the geophone ghost synthetic seismogram decomposed into a series of six narrow bandpass filters.

Figure 7A:
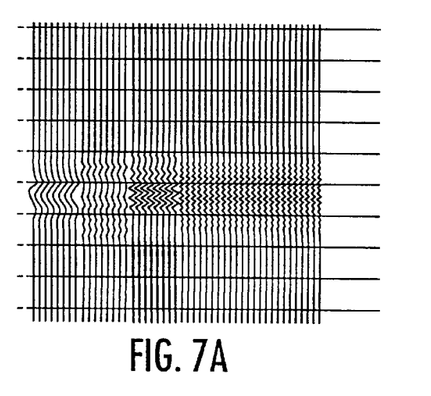
FIG. 7a is FIG. 6a after the application of one normalization factor per bandpass.
Figure 7B:
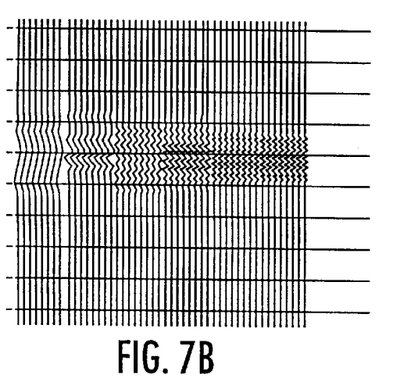
FIG. 7b is FIG. 6b after the application of one normalization factor per bandpass.

FIG. 7a is FIG. 6a after the application of one normalization factor per bandpass. FIG. 7b is FIG. 6b after the application of one normalization factor per bandpass.

Figure 8A:
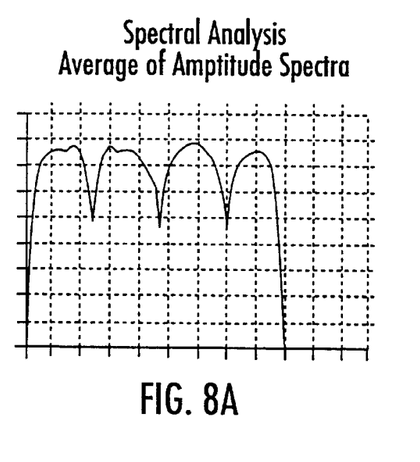
Figure 8B:
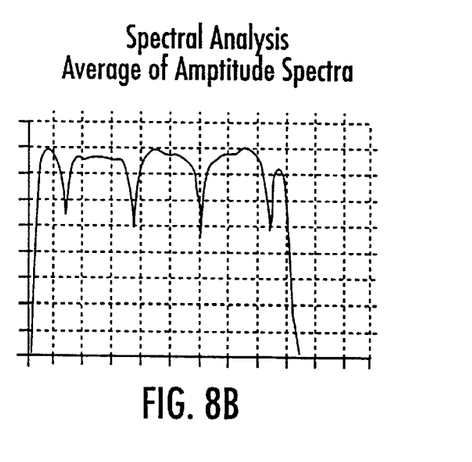
FIG. 8b is the amplitude spectrum of the summation of FIG. 7b.

FIG. 8a is the amplitude spectrum of the summation of FIG. 7a. This is the composite hydrophone ghost synthetic seismogram. The notches are still present. They have not been filled with noise, a byproduct of deconvolution, since no inverse filtering was performed. FIG. 8b is the amplitude spectrum of the summation of FIG. 7b. This is the composite geophone ghost synthetic seismogram. The notches are still present. They have not been filled with noise, a byproduct of deconvolution, since no inverse filtering was performed.

Figure 9A:
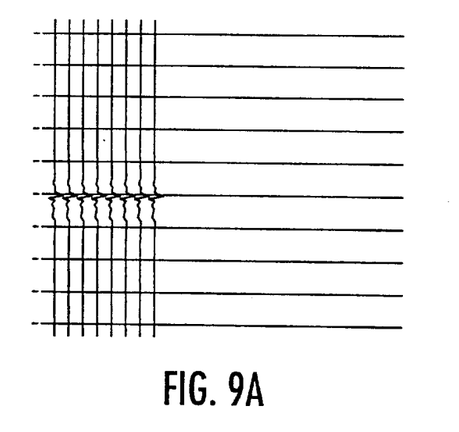
FIG. 9a is the final result of summing the composite hydrophone and geophone ghost synthetic seismograms.
Figure 9B:
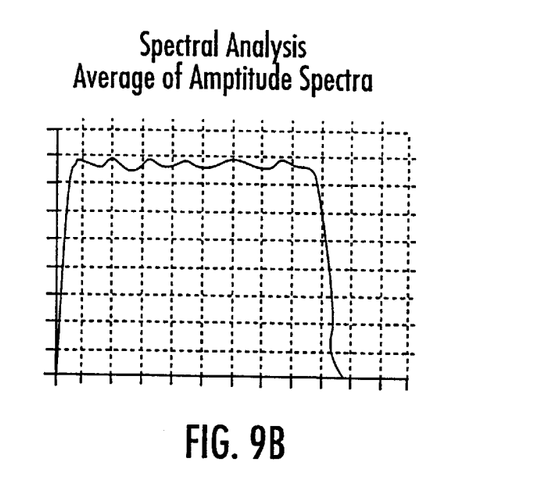
FIG. 9b is the amplitude spectrum of FIG. 9a, the final result.

FIG. 9a is the final result of summing the composite hydrophone and geophone ghost synthetic seismograms. Compared with FIGS. 4a and 4b, the hydrophone and geophone ghost synthetic seismograms, it's evident that the reverberation has been removed. In fact, there is excellent agreement with FIG. 2a, the input wavelet. FIG. 9b is the amplitude spectrum of FIG. 9a, the final result. There is excellent agreement with FIG. 2b, the amplitude wavelet of the input wavelet, or desired result. A second model was generated which included geophone coupling imperfections. These were modeled as a minimum phase low-pass filter, which was convolved with the geophone ghost reverberation sequence.

Figure 10A:
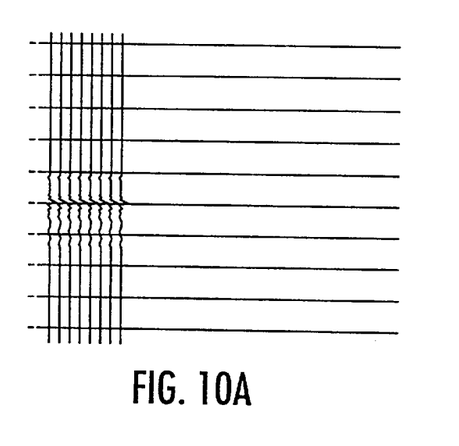
FIG. 10a is the final result when geophone coupling problems were simulated.
Figure 10B:
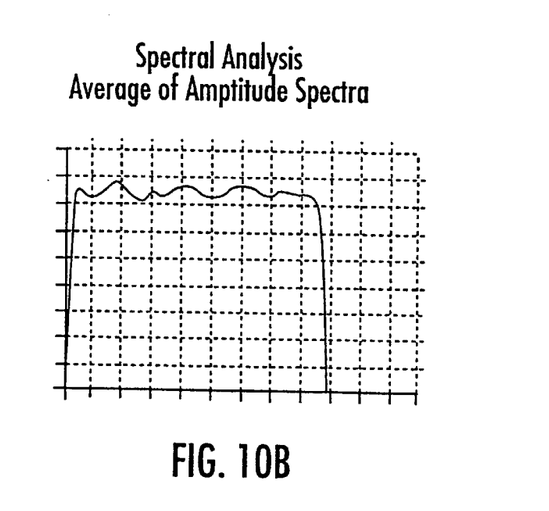
FIG. 10b is the amplitude spectrum of FIG. 10a, the final result when coupling problems were simulated.

FIG. 10a is the final result when geophone coupling problems were simulated. There is good agreement with FIG. 2a, the input wavelet. FIG. 10b is the amplitude spectrum of FIG. 10a, the final result when geophone coupling problems were simulated. There is good agreement with FIG. 2b, the amplitude spectrum of the input wavelet. However, the results are less than optimal, since no attempt is made to address coupling phase differences.

Figure 11:
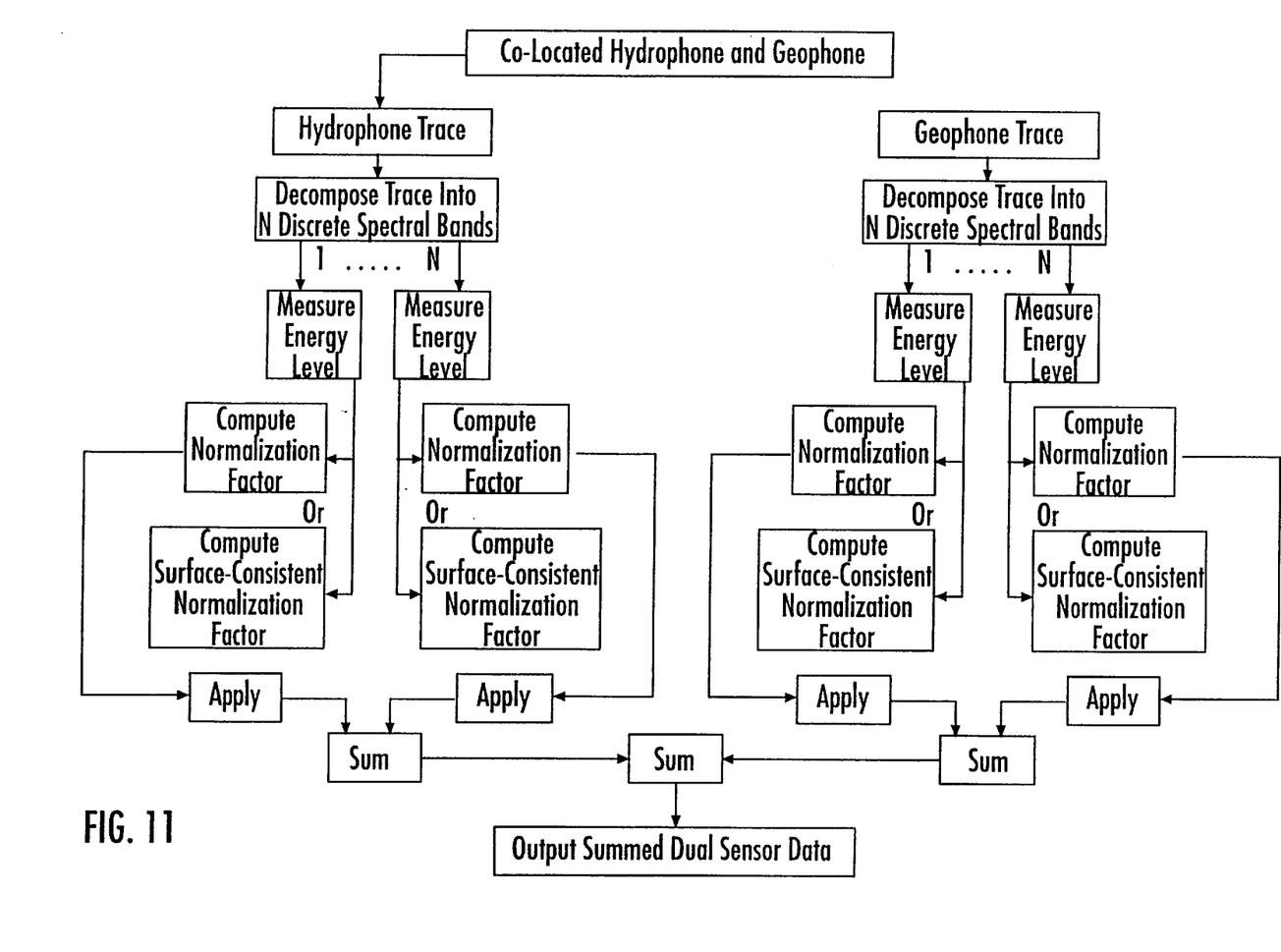
FIG. 11 is a flow diagram detailing the steps of a preferred method.

FIG. 11 is a flow diagram detailing the steps of a preferred method.

In noisy areas, especially where the noise is limited to specific frequency bands or varies significantly in strength between the two sensors, or where significant coupling imperfections exist, this process can produce improved results when compared to the prior art. Although no attempt is made to compensate for phase differences due to coupling imperfections, a first order approximation to amplitude related coupling differences is inherent.

Subsequent deconvolution may improve results.

The initially targeted systems for deployment of the software are the Intel i860, Intel Paragon, IBM RS6000, and IBM SP-2.

What is claimed is:

1. A process for attenuating noise is co-located hydrophone/geophone data, said process comprising:
    receiving a hydrophone signal at a hydrophone seismic sensor located at a hydrophone/geophone receiver location from a seismic signal source;
    decomposing said hydrophone signal into a plurality of bandwidth-limited hydrophone signals;
    receiving a geophone signal at a geophone seismic sensor located at the hydrophone/geophone receiver location from the seismic signal source;
    decomposing said geophone signal into a plurality of bandwidth-limited geophone signals, the pass-bands of the bandwidth-limited geophone signals being substantially equal to the pass-bands of the bandwidth-limited hydrophone signals;
    normalizing said hydrophone and geophone signals; and combining the normalized signals;
    wherein coherent noise is attenuated in the combined and normalized signals.

2. A process as in claim 1, wherein said decomposing comprises passing said signal through a plurality of band-pass filters.

3. A process as in claim 1, further comprising measuring an energy level of said bandwidth-limited signals during a time window.

4. A process as in claim 3, wherein said measuring an energy level comprises determining a root-mean-square of an amplitude of said bandwidth-limited signals.

5. A process as in claim 1, wherein said normalizing comprises applying a normalization factor to said bandwidth-limited signals.

6. A process as in claim 5, wherein said normalization factor is applied to a plurality of common shot bandwidth-limited signals.

7. A process as in claim 5, wherein said normalization factor is applied to a plurality of common group bandwidth-limited signals.

8. A process as in claim 5, wherein said normalization factor is applied to a plurality of common offset bandwidth-limited signals.

9. A process as in claim 5, wherein said normalizing comprises applying a surface-consistent normalization factor.

10. A process as in claim 1, wherein said normalizing comprises determining a normalization factor by dividing said energy level into a constant.

11. A process as in claim 1, further comprising preconditioning said seismic signal by convolving said seismic signal with a theoretical reverberation sequence.

12. A process as in claim 1, further comprising convolving said bandwidth-limited signals with a theoretical reverberation sequence.

13. A process for analyzing a set of seismic data received at a hydrophone/geophone receiver location, said process comprising:
    decomposing a hydrophone signal into a plurality of bandwidth-limited hydrophone signals by passing said hydrophone signal through a plurality of bandpass filters, said signal representing a recording of seismic signals received at a hydrophone located at a hydrophone/geophone receiver location;
    decomposing a geophone signal into a plurality of bandwidth-limited geophone signals by passing said geophone signal through the plurality of bandpass filters, said geophone signal representing a recording of seismic signals received at a geophone located at a hydrophone/geophone receiver location;
    measuring an energy level for each of said bandwidth-limited geophone and hydrophone signals;
    computing a normalization factor for each of said bandwidth-limited geophone and hydrophone signals based on the corresponding energy level;
    normalizing each bandwidth-limited geophone and hydrophone signal with its corresponding normalization factor;
    summing said normalized bandwidth-limited geophone and hydrophone signals;
    wherein coherent noise is attenuated in the combined and normalized signals.

14. An apparatus for attenuating noise in co-located hydrophone/geophone data, said apparatus comprising:
    a seismic sensor signal decomposer which produces a plurality of geophone and hydrophone bandwidth-limited signals from a geophone signal and a hydrophone signal, wherein the geophone signal and the hydrophone signal represent a recording of data at a hydrophone/geophone receiver location;
    a normalizer of the geophone and hydrophone bandwidth-limited signals;
    and a normalized signal summer;
    wherein coherent noise is attenuated in the combined and normalized signals.

15. An apparatus as in claim 14, wherein said decomposer further comprises a plurality of bandpass filters.

16. An apparatus as in claim 14, wherein said normalizer is responsive to the energy level of a plurality of said bandwidth-limited signals during a time window.

17. An apparatus as in claim 16, further comprising an energy level detector connected to an energy level input of said normalizer.

18. An apparatus as in claim 17, wherein said energy level detector provides said normalizer with a root-mean-square value of an amplitude of at least one of said bandwidth-limited signals.

19. An apparatus as in claim 14, wherein said normalizer applies a normalization factor to a plurality of bandwidth-limited signals.

20. An apparatus as in claim 19, wherein said normalization factor is applied to a plurality of traces in a common shot.

21. An apparatus as in claim 19, wherein said normalization factor is applied to a plurality of traces in a common group.

22. An apparatus as in claim 19, wherein said normalization factor is applied to a plurality of traces with a common offset.

23. An apparatus as in claim 19, wherein said normalizer applies surface-consistent factors for each bandwidth.

24. An apparatus as in claim 14, wherein said normalizer determines a normalization factor by dividing said energy level into a constant.

25. An apparatus as in claim 24, wherein said constant comprises a predetermined amplitude level, set on a prospect-wide basis.

26. An apparatus as in claim 14, further comprising a preconditioner which convolves said seismic signal with a theoretical reverberation sequence based upon a measured water depth and a presumed water bottom reflectivity.

27. An apparatus as in claim 14, further comprising a bandwidth-limited signal convolver responsive to a theoretical reverberation sequence based upon a measured water depth and a presumed water bottom reflectivity.

28. A method as in claim 1 wherein said combining comprises addition of each of the normalized pass-bands of the hydrophone signal with corresponding pass-bands of the normalized geophone signal.

29. A method as in claim 1 wherein said combining comprises:

combining the individual pass-bands of each of the hydrophone and geophone signals, wherein a combined normalized hydrophone signal and a combined normalized geophone signal are defined, and summing the combined normalized hydrophone signal and the combined normalized geophone signal.

* * * * *